United States Patent [19]

Scholbrock

[11] 4,273,285
[45] Jun. 16, 1981

[54] WEED SPRAYING ASSEMBLY

[75] Inventor: Sylvanus L. Scholbrock, Marion, Iowa

[73] Assignee: Ex-Cell-O Corporation, Troy, Mich.

[21] Appl. No.: 60,637

[22] Filed: Jul. 25, 1979

[51] Int. Cl.$^3$ .............................................. B05B 1/28
[52] U.S. Cl. ................................. 239/121; 239/148; 239/164
[58] Field of Search .................. 239/104, 120–122, 239/124, 126, 148, 164, 168; 47/1.5, 1.7; 4/301, 310; 403/230, 397, 258, 262; D8/363; 248/74 A

[56] References Cited

U.S. PATENT DOCUMENTS

| D. 185,767 | 7/1959 | McCann | 4/310 |
|---|---|---|---|
| 1,416,065 | 5/1922 | Rhodes | 239/121 |
| 1,789,945 | 1/1931 | Ready | 239/104 |
| 1,863,914 | 6/1932 | Tyler | 239/122 |
| 3,257,989 | 6/1966 | Webb | 239/104 |
| 3,584,787 | 6/1971 | Thomason | 239/121 |
| 4,060,026 | 11/1977 | Löhr et al. | 239/124 X |
| 4,136,848 | 1/1979 | McCollum | 248/74 A |
| 4,139,156 | 2/1979 | Field et al. | 239/121 |
| 4,168,798 | 9/1979 | Moore et al. | 239/121 |

*Primary Examiner*—Robert W. Saifer
*Attorney, Agent, or Firm*—McGlynn and Milton

[57] ABSTRACT

A vegetation spraying assembly including a support framework mounted on the front of a tractor and movable vertically by hydraulic cylinders. A plurality of arms extend forwardly from the framework to distal ends supporting wedge-shaped guards with spraying nozzles supported rearwardly of the guards and aimed to spray rearwardly in a horizontal pattern. A plurality of collector trays are supported on the framework rearwardly of the spray nozzles. Each collector tray is an integral plastic member having end walls and a vertical back wall extending between the end walls. Each collector tray has a forwardly facing spray-receiving opening and a catch basin below the opening. A projection extends along and below the opening and is defined by first and second walls extending rearwardly from an apex for engaging and preventing vegetation from engaging the opening. A lip wall extends upwardly and forwardly from one of the walls defining the projection and defines the lower periphery of the opening. A short top wall extends forwardly from the top of the back wall for defining the top periphery of the opening. The end walls define the end peripheries of the opening and slant downwardly and forwardly from the top wall to the lip wall so that the periphery of the opening is disposed in a plane which is at an acute angle relative to the back wall. A fibrous pad or screen is supported in the opening at an angle for receiving the liquid spray which does not engage vegetation which spray passes therethrough and collects in the catch basin of each collector tray.

30 Claims, 8 Drawing Figures

WEED SPRAYING ASSEMBLY

BACKGROUND OF THE INVENTION (1) Field of the Invention

The subject invention relates to a spraying assembly adapted to be attached to a vehicle such as a tractor for spraying undesired vegetation or plants such as weeds, grasses, etc., occurring around crops in cultivated fields. Such spraying assemblies spray chemicals which may be deadly to the crop as well as to the undesired plants such as weeds, grasses and the like.

(2) Description of the Prior Art

Spraying assemblies are known where a chemical, i.e., a herbicide, is sprayed horizontally through spray nozzles aligned with an opening in a capture chamber. The fluid streams of herbicide are positioned above the tops of the cultivated plants whereby weeds of greater height than the crop intercept the streams and are sprayed. The sprayed fluid which is not intercepted by the weeds enters the capture chamber opening and is returned to a storage tank for reuse.

Many of the herbicides which are utilized are deadly to the crop as well as to the undesired vegetation and it is imperative that the herbicide not come in contact with the crop. Further, since the herbicide is very expensive it is important that the recovery system be extremely efficient. The problem associated with most of these prior art spraying assemblies is the efficiency of the recapturing of the sprayed liquid as well as some of the sprayed liquid coming in contact with the crop as by splash-back and/or spillage.

SUMMARY OF THE INVENTION

A spraying assembly comprising support means adapted for attachment to a vehicle with spray means supported on the support means for spraying liquid generally horizontally in a predetermined pattern with collector means supported on the support means and having a spray-receiving opening and a liquid catch basin below the opening and permeable means supported by the collector means in the opening and at an acute angle relative to the spray pattern for receiving the liquid spray and allowing the liquid to permeate therethrough and collect in the catch basin. Such an assembly is a very efficient collector of the spray and prevents the sprayed liquid from contacting the crops.

PRIOR ART STATEMENT

A spraying assembly having spray nozzles aimed at openings in the side of capture chambers is disclosed in U.S. Pat. No. 4,139,156, granted Feb. 13, 1979, in the name of D. D. Field et al. The capture chambers have openings on opposite sides for receiving spray from opposite directions. It has been known in such assemblies to utilize a fibrous pad within the capture chamber disposed vertically against which the spray impinges to reduce splash-back. Another such known spraying assembly includes spray nozzles spraying in a rearward, horizontal direction against a vertically disposed fibrous pad, the bottom of which is disposed in an elongated slot in a collector tube with a sheet of plastic within or rearwardly of the fibrous pad against which the spray would impinge. Although these assemblies have proven to be effective, they are not as efficient nor do they prevent the liquid from contacting the crops in the manner in which the subject invention accomplishes same by way of a novel collector means in combination with the disposition of a permeable means at an acute angle relative to the spray pattern.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is an exploded perspective view showing a pair of nozzle support arms, the collector tray and the permeable pad for receiving the liquid spray;

DESCRIPTION OF THE PREFERRED EMBODIMENT

Figure 1:
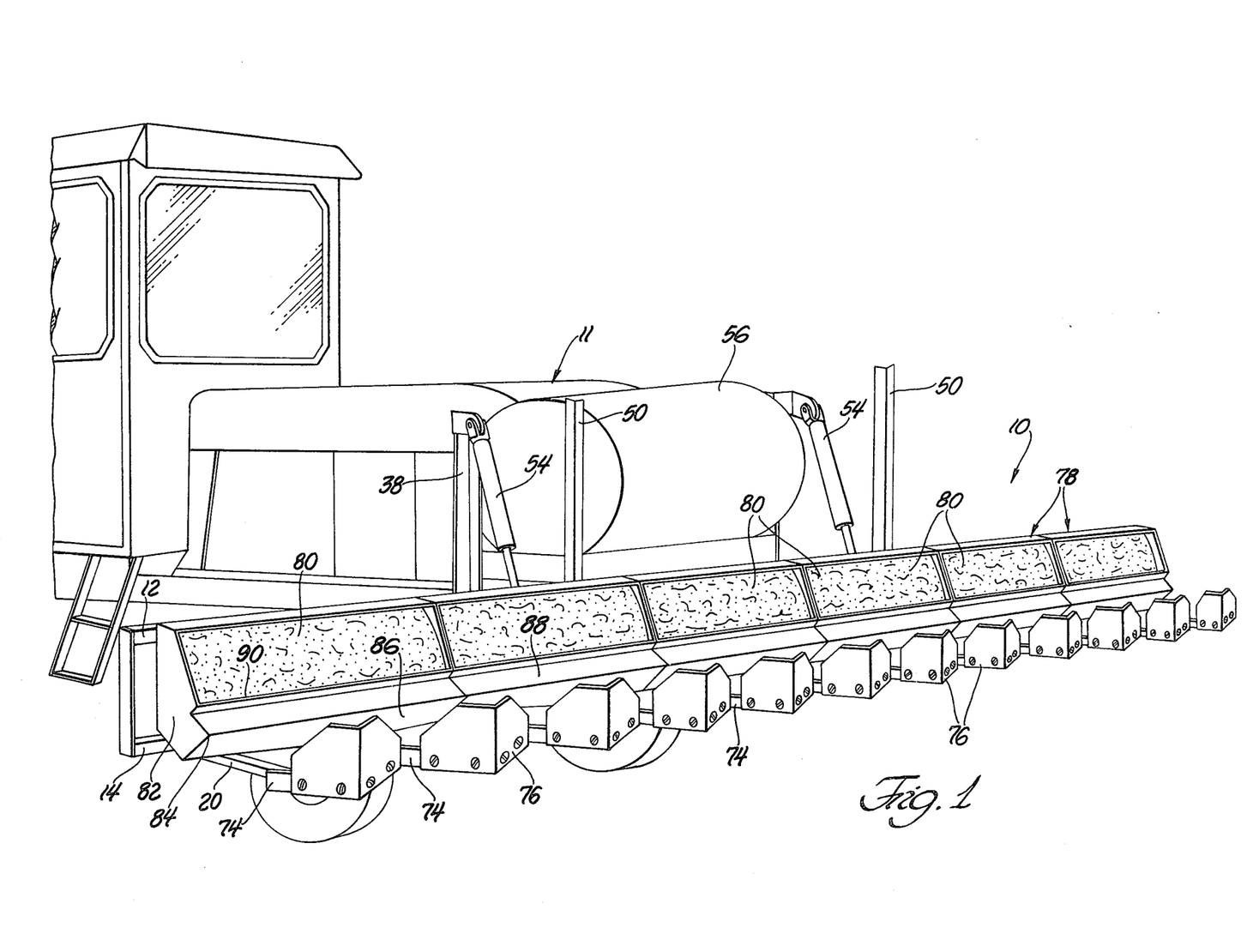
FIG. 1 is a fragmentary perspective view of the spraying assembly of the subject invention.

A spraying assembly constructed in accordance with the subject invention is generally shown at 10. The spraying assembly 10 is mounted on the front of a tractor generally indicated at 11.

Figure 2:
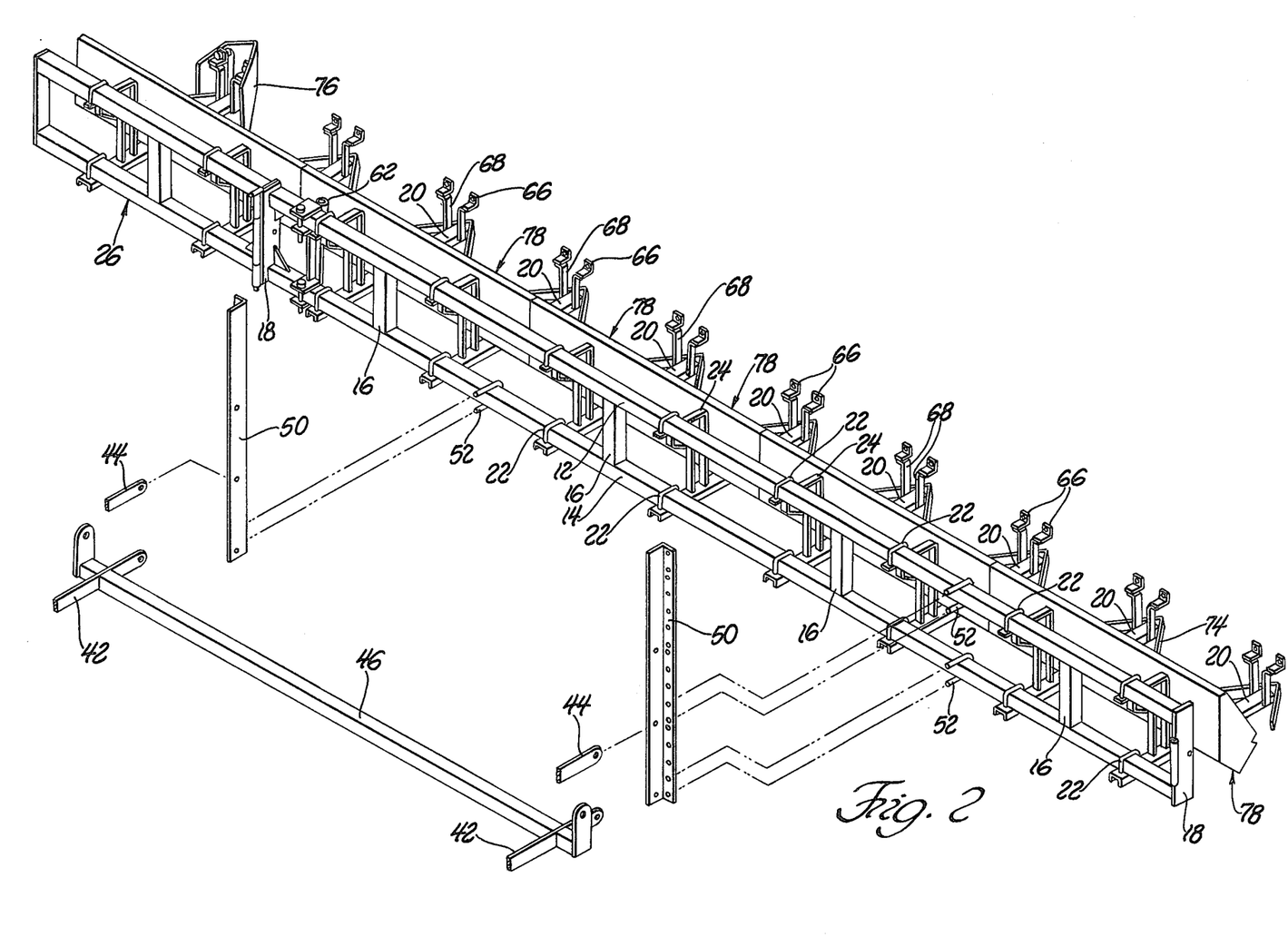
FIG. 2 is an exploded perspective view of a portion of the support means adapted for attachment to a vehicle including a framework with nozzle supporting arms extending forwardly therefrom and with the collector trays thereon.
Figure 2A:
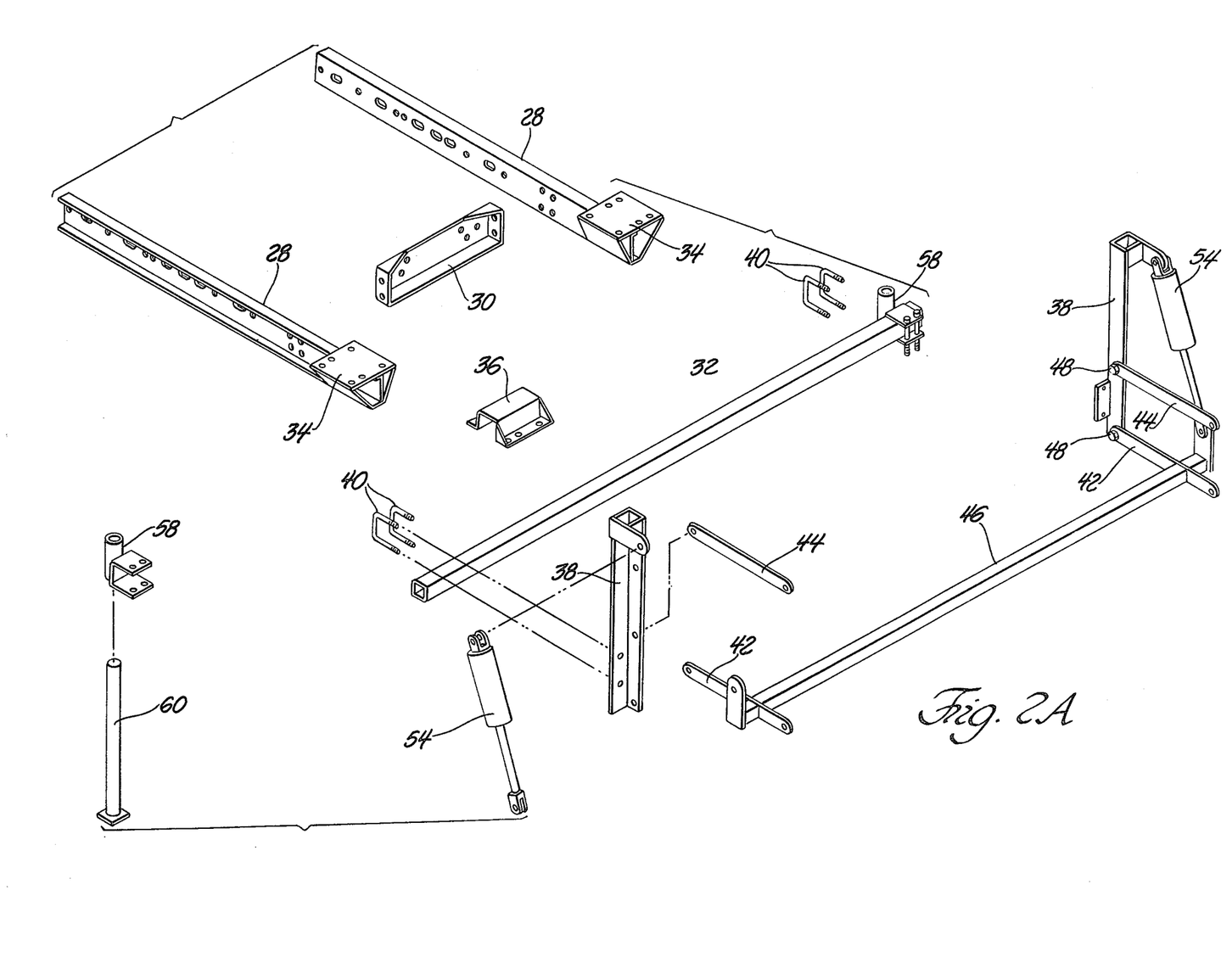
FIG. 2a is an exploded perspective view showing the remainder of the support means including a vehicle attachment means, lift linkages and hydraulic cylinders for vertically positioning the framework illustrated in FIG. 2.

The spraying assembly 10 includes support means adapted for attachment to a vehicle (such as the tractor 11) and illustrated in FIGS. 2 and 2a. The support means includes an elongated framework comprising the upper and lower beams 12 and 14 interconnected by brace members 16. The members 12, 14 and 16 are made of metal and are welded together. Hinge plates 18 are welded to the ends of the beams 12 and 14, the purpose of which will become more clear hereinafter. The support means also includes a plurality of nozzle support arms 20 extending forwardly to a cantilevered distal end. The arms 20 are spaced from one another along the beams 12 and 14 of the framework and are removably attached to the framework by the U-bolts 22. The arms 20 have brackets 24 attached thereto as by welding for securement to the upper beam 12.

As illustrated at the upper end of FIG. 2, a foldable section generally indicated at 26 is attached to the hinge plate 18 and supports two nozzle arms 20 and is normally locked in the position illustrated during use but may be unlocked and folded rearwardly to reduce the width of the assembly for road travel or the like. A similar hinged section is disposed at the lower end and attached to hinge plate 18 in FIG. 2, although it is not illustrated.

The support means also includes vehicle attachment means comprising the beams 28 illustrated in FIG. 2a which are interconnected by a brace 30. The beams 28 are adapted to be attached to the frame of a vehicle such as the tractor 11. The vehicle attachment means also includes the cross beam 32 which is attached to the pads 34 by clamping members 36 only one of which is shown. The cross beam 32, in turn, supports the posts 38 through U-bolts 40. The support means further includes lift linkage comprising two sets of parallelogram links 42 and 44 interconnecting the vehicle attachment means and the framework for allowing the framework to be raised and lowered. The lower link 42 of each of the two sets are interconnected by a beam 46. The first ends of the links 42 and 44 are pivotally connected to the posts 38 of the attachment means as illustrated at 48 in FIG. 2a. The second ends of each of the links 42 and 44 are pivotally connected to the angle members 50 which form a part of the framework and are secured to the beams 12 and 14 by U-bolts 52.

A pair of hydraulic cylinders 54 interconnect the lift linkage means defined by the links 42 and 44, beam 46 and the vehicle attachment means, i.e, the posts 38, for raising and lowering the framework illustrated in FIG. 2. The hydraulic cylinders 54 will be controlled from the cab of the tractor by the operator.

Although not illustrated, a cradle for supporting the storage tank 56 would be supported upon the cross beam 32. Further, support assemblies or parking brackets 58 are attached to the cross beam 32 and have a hole extending therethrough through which a pin may be inserted. A parking post or stand 60 may be inserted into the brackets 58 and has a plurality of holes therein for receiving the pin as it extends through the brackets 58 whereby when the complete assembly is removed from the tractor 11, it may be supported upon the parking posts or stands 60. There are brackets similar to 58 as shown at 62 in FIG. 2 attached to the beams 12 and 14 for receiving posts or stands 60 for supporting the framework when the assembly is removed from the tractor 11. Although only one is shown, it will be appreciated that a number of brackets 62 will be attached to the framework.

The assembly 10 also includes spray means supported on the arms 20 of the support means for spraying liquid, such as a herbicide, generally horizontally in a predetermined pattern. The spray means includes a plurality of spray nozzles. There is also included nozzle support means for adjustably supporting each nozzle 64 for movement about transverse axes. Specifically, the nozzle support means comprises a nozzle support bracket 66 supporting each nozzle 64 and nozzle adjustment bracket 68 supporting each bracket 66. As best illustrated in FIG. 3, each bracket 68 may be adjusted by rotation about its lower pivotal point 70 whereas each bracket 66 may be rotated about its attachment point or axis 72. Thus each nozzle 64 may move about two transverse axes. In most instances the nozzles are positioned as illustrated in FIG. 3 to direct a spray pattern horizontally rearwardly. However, in certain instances the brackets 68 may be rotated to point the nozzles 64 downwardly in the event that a nutrient is to be sprayed upon the crop. The brackets 68 extend upwardly from the support arms 20 and a wedge-shaped support member 74 is welded or otherwise attached to the distal end of each nozzle support arm 20. A wedge-shaped nozzle guard 76 is bolted to each support member 74 and extends upwardly to a position forwardly of the adjacent nozzle 64 to protect the nozzle 64 and to direct weeds to move around the nozzle 64 and into the space between adjacent arms 20.

The spraying assembly 10 also includes collector means comprising a plurality of collector trays generally indicated at 78 supported on the arms 20 of the support means and having a spray-receiving opening and a liquid catch basin below the opening.

Figure 5:
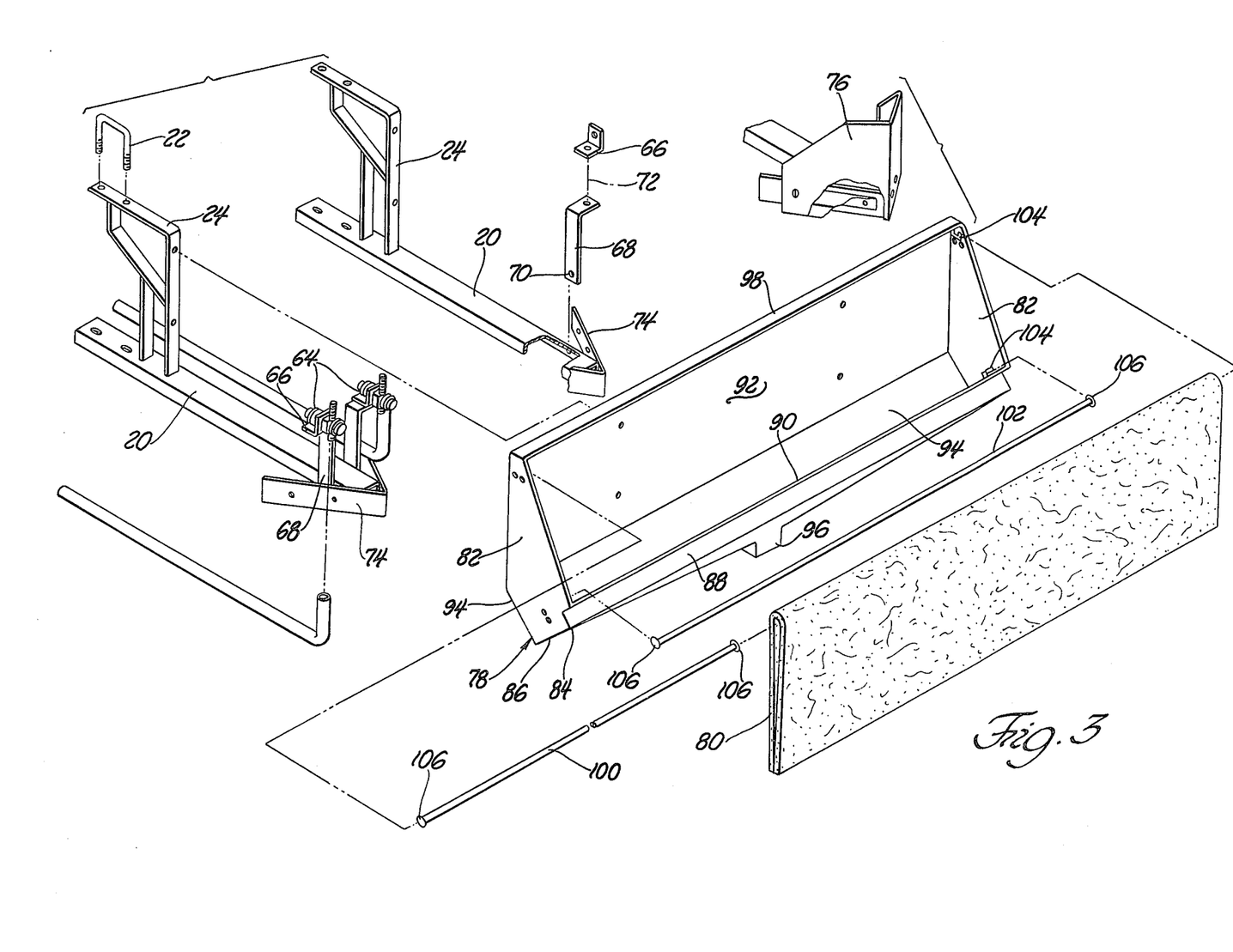
FIG. 5 is a side fragmentary cross-sectional view illustrating the operation of the spray nozzles spraying into the collector tray.
Figure 6:
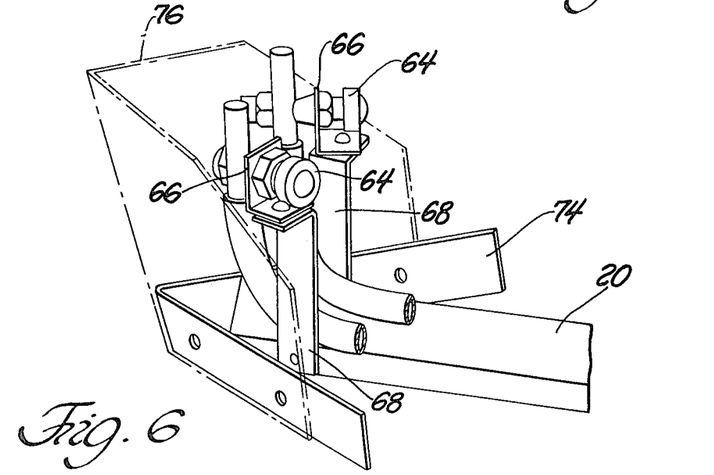
FIG. 6 is a fragmentary perspective view of the distal end of the nozzle support arm showing spray nozzles supported thereon and a wedge-shaped guard in phantom.

A permeable means comprising a fibrous pad 80 is supported by each collector tray 78 in the opening thereof and at an acute angle relative to the spray pattern, as illustrated in FIG. 5, for receiving the liquid spray and allowing the liquid spray to permeate through the pad 80 then drop or collect in the catch basin of each tray 78.

Each collector tray 78 includes weed-engaging means for engaging weeds and preventing the weeds from engaging the spray-receiving opening therein. Specifically, each collector tray 78 has end walls 82 and the weed-engaging means comprises a projection or apex 84 extending between the end walls 82 along and below the opening in the collector tray. The projection or apex 84 is defined by first and second walls 86 and 88 extending rearwardly from the apex 84. The first wall 86 extends rearwardly and downwardly from the apex and the second wall 88 extends rearwardly and upwardly from the apex 84.

Figure 4:
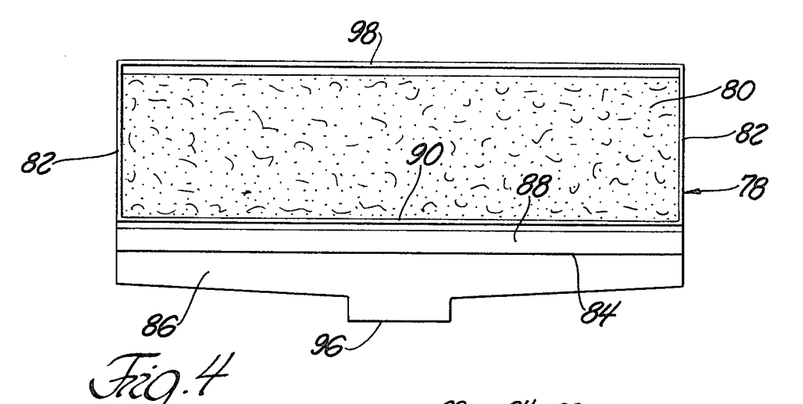
FIG. 4 is a front-elevational view of a collector tray and a permeable pad disposed therein constructed in accordance with the subject invention.

Each collector tray 78 also includes a lip wall 90 extending upwardly and forwardly from the second wall 88 and defines the lower periphery of the opening in the collector tray. Each collector tray also has a closed back wall 92 disposed rearwardly of the opening. The back wall 92 of each collector tray is vertical and the catch basin for receiving a liquid is defined by the first wall 86 and a rear bottom wall 94. The rear bottom wall 94 extends upwardly and rearwardly from the first wall 86 to the bottom of the back wall 92. The catch basin defined by the walls 86 and 94 slants downwardly from each of the end walls 82 toward the middle of each tray as best illustrated in FIG. 4. Each collector tray 78 also includes a sump 96 at the middle of each catch basin and extending downwardly from and below the catch basin for receiving liquid collected in the catch basin.

Each collector tray also includes a short top wall 98 extending forwardly from the top of the back wall 92 and defining the top periphery of the opening in the collector tray. The end walls 82 define the end peripheries of the opening and slant downwardly and forwardly from the outer edge of the top wall 98 to the outer edge of the lip wall 90.

Preferably, each collector tray 78 is an integral member made of a plastic material.

Each collector tray 78 is attached to the brackets 24 on a pair of adjacent nozzle support arms 20 by appropriate fasteners extending through the rear wall 92 of each collector tray whereby two nozzle support arms 20 extend forwardly under each collector tray 78. The assembly 10 includes a plurality of collector trays 78 disposed in abutting end-to-end relationship with one another.

A fibrous pad 80 is supported at an acute angle relative to the general direction of the spray from each nozzle 64 and at an acute angle to the rear wall 92 as well as at an acute angle to the direction of movement of the assembly 10 over the ground. The assembly includes snap-in retaining means for removably supporting each pad 80 in a collector tray 78. Specifically, the snap-in retaining means includes a pair of rods 100 and 102 extending between the end walls 82 of each collector tray 78 and snap-in clips 104, as illustrated in FIG. 3, attached to the end walls 82 for receiving and retaining the ends 106 of the rods 100 and 102. The ends of the rods 100 and 102 have disc-shaped or button-like members disposed thereon which slide or snap into the U-shaped clips 104. The fibrous pad 80 is disposed in a U-shaped configuration and the upper rod 100 is disposed within the U shape for supporting the upper end of pad within the collector tray 78. However, the lower rod 102 is pressed against the outside of the lower surface of the pad pushing the pad against the second wall 88 to maintain the pad in position at an acute angle relative to the spray.

Figure 7:
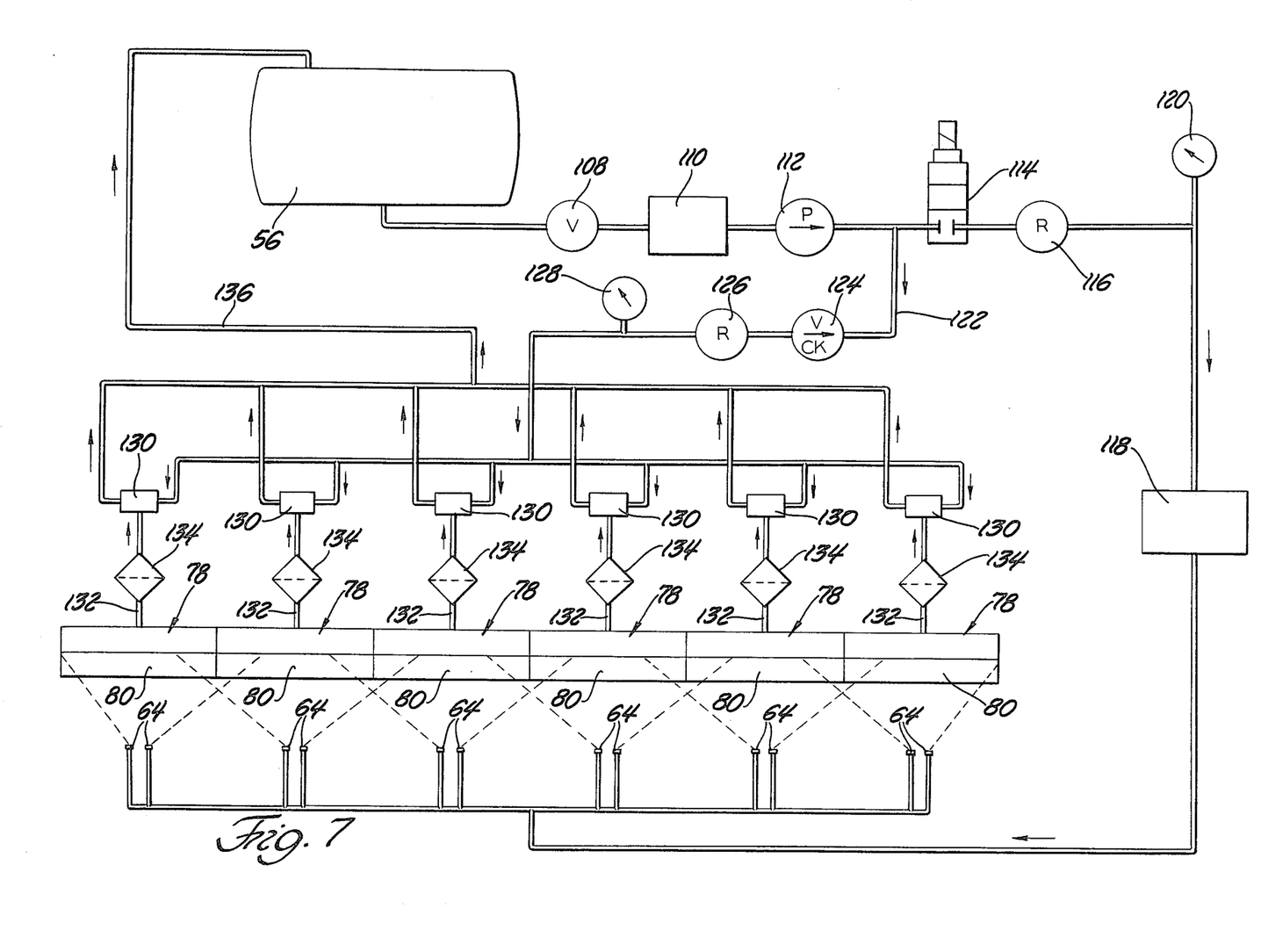
FIG. 7 is a schematic view showing the various components for controlling the flow of liquid from a storage tank through the spray nozzles and back to the storage tank.

Referring now to FIG. 7, there is illustrated schematically the flow of herbicide in the spraying assembly 10. The herbicide is stored in the tank 56, flows through a tank shut-off valve 108 and through a strainer or filter 110 into a pump 112.

The output of the pump 112 is supplied to the spray nozzle 64 through the spray nozzle circuit including the solenoid actuated valve 114, a pressure regulator 116 and a second strainer or filter 118. Also included in the spray nozzle circuit is a pressure gauge 120.

The output of the pump 112 is also supplied to a parallel ejector circuit through line 122, through one-way check valve 124 and pressure regulator 126. The one-way check valve 124 prevents drainage from the tank 56 into the collector tray 78 when the system is shut down. Also in the ejector circuit in line 122 is a pressure indicator or gauge 128.

There is an ejector supported exteriorly of each collector tray 78. Each ejector 130 has a suction line 132 extending therefrom and into the associated collector tray 78 and, specifically, into the sump 96 for withdrawing liquid from each collector tray. A removable filter cartridge unit 134 is disposed in each suction line 132 between each sump 96 and each ejector 130. A plurality of fluid lines interconnect the output line 122 from the pump with the plurality of ejectors 130 whereby each ejector 130 has a separate inlet and each ejector 130 has a separate outlet to a main line 136 returning to the tank 56 whereby the ejectors 130 are connected in parallel between the input line 122 and the return line 136.

Each filter 134 is disposed exteriorly of each collector tray 78 and is easily accessible whereby the filter cartridge may be removed, cleaned and/or replaced.

During operation of the system the tractor 11 is usually moving through a field of crops where undesired weeds extend upwardly above the crops. The guards 76 engage the weeds directing the weeds around the nozzles 64 and into the spaces between the nozzle support arms 20 where the weeds are sprayed. This is accomplished as the pump 112 is activated as is the solenoid valve 114 and pressure is supplied both to the nozzle circuit and to the ejector circuit through the line 122. The spray which does not engage a weed impinges upon the fibrous pad 80 and passes therethrough and into the bottom of each collector tray 78. Because the pad 80 is at an angle there is minimal, if any, splash-back. Fluid pressure or fluid flow is passing through each ejector 130 to create a vacuum on the suction line 132 drawing collected liquid from the sump 96 of each collector tray 78. In shutting the system down the solenoid 114 would first be moved to the closed position stopping fluid flow to the nozzles 64 while continuing the supply of fluid to the line 122 and the ejectors 130. Once all of the liquid had been removed from the respective collector trays 78, the pump 112 would be turned off and the one-way check valve 124, which is a pressure-responsive valve, would close, preventing any flow to the ejectors as a result of the head or pressure of the liquid in the storage tank 56.

The nozzle collector tray 78 improves recovery by disposing the fibrous pad 80 at an acute angle in the opening thereof, eliminating the possibility of the sprayed liquid from falling and contacting the crop. Additionally, the collector tray 78 prevents the weeds and grasses from contacting the opening or the filter pad 80 therein because of the projection 84 which engages the weeds and prevents the weeds from entering the opening. Each collector tray, in the manner in which it collects the liquid in the catch basin and the sump 96, improves suction and reduces slosh and spillage. The individually adjustable nozzle support brackets 66 and 68 allow the spray pattern from each nozzle to be accurately directed.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A spraying assembly comprising; support means adapted for attachment to a vehicle, spray means supported on said support means for spraying liquid generally horizontally in a predetermined pattern, collector means supported on said support means and having a spray-receiving opening and liquid catch basin below said opening, and permeable means supported by said collector means in said opening and at an acute angle relative to said spray pattern for receiving the liquid spray and allowing the liquid to permeate therethrough and collect in said catch basin.

2. An assembly as set forth in claim 1 wherein said collector means has closed end walls and a closed back wall rearwardly of said opening and said catch basin slants downwardly from each of said end walls toward the middle thereof.

3. An assembly as set forth in claim 1 wherein said collector means includes weed-engaging means for engaging weeds and preventing the weeds from engaging said spray-receiving opening.

4. An assembly as set forth in claim 3 wherein said collector means has closed end walls and said weed-engaging means comprises a projection extending between said end walls along and below said opening.

5. An assembly as set forth in claim 4 wherein said collector means comprises an integral collector tray with said projection defined by first and second walls of said collector tray extending from an apex, said first wall extending rearwardly and downwardly from said apex and said second wall extending rearwardly and upwardly from said apex.

6. An assembly as set forth in claim 5 wherein said collector tray includes a lip wall extending upwardly and forwardly from said second wall and defining the lower periphery of said opening.

7. An assembly as set forth in claim 6 wherein said collector tray has a closed back wall rearwardly of said opening and said catch basin slants downwardly from each of said end walls toward the middle thereof.

8. An assembly as set forth in claim 7 wherein said collector tray includes a sump at the middle of said catch basin and extending downwardly for receiving liquid collected in said catch basin.

9. An assembly as set forth in claim 8 wherein said collector tray is made of an integral piece of plastic.

10. An assembly as set forth in claim 9 wherein said back wall of said collector tray is generally vertical, said catch basin is defined by said first wall and a rear bottom wall extending upwardly and rearwardly from said first wall to the bottom of said back wall, and including a short top wall extending forwardly from the top of said back wall and defining the top periphery of said opening, said end walls defining the end peripheries of said opening and slant downwardly and forwardly from said top wall to said lip wall.

11. An assembly as set forth in claim 10 wherein said permeable means comprises a fibrous pad.

12. An assembly as set forth in claim 11 including snap-in retaining means for removably supporting said pad in said collector tray.

13. An assembly as set forth in claim 12 wherein said snap-in retaining means includes at least one rod extending between said end walls of said collector tray.

14. An assembly as set forth in claim 13 wherein said snap-in retaining means further includes snap-in clips attached to said end walls for receiving and retaining the ends of said rod.

15. An assembly as set forth in claim 1 wherein said collector means is defined by an integral plastic piece.

16. An assembly as set forth in claim 1 including snap-in retaining means for removably supporting said permeable means in said collector means.

17. An assembly as set forth in claim 16 wherein said collector means includes end walls at each end of said opening and said snap-in retaining means includes at least one rod extending between said end walls.

18. An assembly as set forth in claim 17 wherein said snap-in means further includes snap-in clips attached to said end walls for receiving and retaining the ends of said rod.

19. An assembly as set forth in claim 1 wherein said collector means is supported on said support means with said opening facing forwardly, said support means extending forwardly of said collector means to a distal end, said spray means being supported on said distal end.

20. An assembly as set forth in claim 19 wherein said spray means includes at least one nozzle, nozzle support means for adjustably supporting said nozzle for movement about two transverse axes.

21. An assembly as set forth in claim 20 wherein said support means includes a plurality of arms extending forwardly below said collector means to said distal end, one of said nozzle support means extending upwardly from each of said arms, and including a wedge-shaped guard attached to said distal end of each arm and extending upwardly to a position forwardly of said adjacent nozzle to protect the nozzles and to direct weeds to move around said nozzles and into the space between said arms.

22. An assembly as set forth in claim 21 wherein said collector means comprises an integral plastic collector tray and including a plurality of said collector trays disposed in end-to-end relationship.

23. An assembly as set forth in claim 22 wherein said support means includes an elongated framework, said arms being spaced along said framework and removably attached to said framework.

24. An assembly as set forth in claim 23 wherein said support means includes vehicle attachment means and lift linkage means interconnecting said vehicle attachment means and said framework for allowing said framework to be raised and lowered.

25. An assembly as set forth in claim 24 including a pair of spaced hydraulic cylinders interconnecting said lift linkage means and said vehicle attachment means for raising and lowering said framework.

26. An assembly as set forth in claim 25 wherein said lift linkage means comprises two sets of parallelogram links with the first ends of each set pivotally connected to said attachment means and the second ends of each set pivotally connected to said framework.

27. An assembly as set forth in claim 1 wherein said collector means has closed end walls and a closed back wall rearwardly of said opening, said catch basin slanting downwardly from each end wall toward the middle thereof, a sump at the middle of said catch basin and extending downwardly for receiving liquid collected in said catch basin, an ejector supported exteriorly of said collector means, a suction line extending from said ejector to said sump for withdrawing liquid therefrom.

28. An assembly as set forth in claim 27 including a removable filter cartridge in said suction line between said sump and said ejector.

29. An assembly as set forth in claim 28 including a plurality of said collector means and a plurality of said ejectors with each ejector associated with one of said collector means, a liquid storage tank, a pump in communication with said storage tank, fluid lines interconnecting the output of said pump and said ejectors with said ejectors being connected in parallel and return lines from said ejectors to said storage tank.

30. An assembly as set forth in claim 29 including supply line means communicating the output of said pump to said spray means for supplying liquid thereto.

* * * * *